United States Patent
Hoynant et al.

(10) Patent No.: US 8,485,096 B2
(45) Date of Patent: Jul. 16, 2013

(54) METHOD FOR DRYING PRINTING INK AND PRINTING INK

(75) Inventors: Pierre Hoynant, Avilly Saint Leonard (FR); Heiner Pitz, Weinheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1136 days.

(21) Appl. No.: 12/329,948

(22) Filed: Dec. 8, 2008

(65) Prior Publication Data

US 2009/0145318 A1    Jun. 11, 2009

(30) Foreign Application Priority Data

Dec. 7, 2007  (DE) .......................... 10 2007 059 334

(51) Int. Cl.
*B41L 35/14*   (2006.01)

(52) U.S. Cl.
USPC ........................................... 101/488; 101/491

(58) Field of Classification Search
USPC ....................................................... 101/488
See application file for complete search history.

(56) References Cited

U.S. PATENT DOCUMENTS

| | | | |
|---|---|---|---|
| 3,301,439 A | | 1/1967 | Kosar et al. |
| 4,170,578 A | * | 10/1979 | Schelhaas ........................ 524/49 |
| 5,232,780 A | * | 8/1993 | Nuyken et al. ............. 428/402.21 |
| 6,105,502 A | * | 8/2000 | Wagner et al. ................. 101/491 |
| 6,467,897 B1 | * | 10/2002 | Wu et al. ........................ 347/102 |
| 6,829,996 B2 | | 12/2004 | Jung et al. |
| 6,857,368 B2 | | 2/2005 | Pitz |
| 6,889,608 B2 | | 5/2005 | Pitz |
| 7,270,929 B2 | * | 9/2007 | Kwasny et al. ................ 430/138 |
| 7,435,348 B2 | * | 10/2008 | Chen ........................ 210/500.23 |
| 2004/0206260 A1 | | 10/2004 | Pitz et al. |
| 2005/0196710 A1 | * | 9/2005 | Shiroguchi .................... 430/322 |
| 2007/0096057 A1 | * | 5/2007 | Hampden-Smith et al. ........................ 252/301.16 |

FOREIGN PATENT DOCUMENTS

| | | |
|---|---|---|
| DE | 1 542 260 | 3/1970 |
| DE | 101 49 009 A1 | 4/2003 |
| DE | 102 34 076 A1 | 4/2003 |
| DE | 103 16 471 A1 | 10/2004 |
| DE | 103 16 472 A1 | 10/2004 |
| DE | 10 2006 007 947 A1 | 9/2006 |
| DE | 10 2006 012 329 A1 | 9/2007 |
| DE | 10 2006 048 958 A1 | 9/2007 |

(Continued)

OTHER PUBLICATIONS

German Patent and Trademark Office Search Report, dated Dec. 7, 2007.

*Primary Examiner* — Anthony Nguyen
(74) *Attorney, Agent, or Firm* — Laurence A. Greenberg; Werner H. Stemer; Ralph E. Locher

(57) ABSTRACT

A method for drying printing ink containing an inactive active substance enclosed before drying in a reaction-inhibited form in a transport substance, for accelerating the drying of the printing ink on a print medium, includes applying the printing ink to a print medium being dried at a reaction site by supplying energy to the printing ink, and releasing the active substance by an energy supply from the transport substance at the reaction site for activation. A printing ink includes an active substance enclosed before drying in a reaction-inhibited form in a transport substance, for accelerating the drying of the printing ink on a print medium. The active substance is releasable during the drying by an energy supply from the transport substance at the reaction site.

23 Claims, 2 Drawing Sheets

FOREIGN PATENT DOCUMENTS

| | | | |
|---|---|---|---|
| GB | 217345 A2 * | 10/1986 | |
| JP | 1170673 A | 7/1989 | |
| JP | 9040897 A | 2/1997 | |
| JP | 2000219835 A | 8/2000 | |
| JP | 2004115655 A | 4/2004 | |
| JP | 2004306599 A | 11/2004 | |

* cited by examiner

METHOD FOR DRYING PRINTING INK AND PRINTING INK

CROSS-REFERENCE TO RELATED APPLICATION

This application claims the priority, under 35 U.S.C. §119, of German Patent Application DE 10 2007 059 334.3, filed Dec. 7, 2007; the prior application is herewith incorporated by reference in its entirety.

BACKGROUND OF THE INVENTION

Field of the Invention

The invention relates to a method for drying printing ink which contains an inactive active substance for accelerating the drying of the printing ink on a print medium, in which the printing ink is applied to a print medium and dried at a reaction site by supplying energy to the printing ink, and the active substance is activated at the reaction site. The invention furthermore relates to a printing ink including an active substance for accelerating the drying of the printing ink on a print medium, in which the active substance is present in an inactive form in the printing ink prior to drying and is activatable during the drying.

Print media provided with printing ink, in particular offset printing ink, flexographic printing ink or screen printing ink, must as a rule be dried prior to further imprinting, treatment or processing in a targeted method or by targeted use of a correspondingly suitable apparatus, since the physical and/or chemical processes on which the drying is based take place too slowly under the usual ambient conditions without supporting measures. In this respect, it is generally already known that drying can be accelerated by an energy supply through the use of electromagnetic radiation, for example through the use of infrared or ultraviolet light, or through the use of hot air or by rapid removal of reaction products of the drying.

Catalysts are frequently used with regard to printing inks drying by reaction. For example, so-called siccatives (metal salts, generally cobalt or manganese salts, oxoborates and the like) are used as additive of offset printing ink mixtures, as catalysts for the oxidative polymerization of oils or resins. The siccatives are chosen for a specific ink composition so that they have as good solubility as possible in the printing ink and are nontoxic and very effective. Alternatively, for example, peroxides are also used in printing inks as heat-activatable drying accelerators of unsaturated polyesters, offset printing inks containing polyester waxes and alkyd resins (fatty acid-modified, unsaturated polyesters). For such direct drying accelerators, it is true that they must not produce excessively rapid, undesired drying, in particular during the processing of the printing ink in the printing press itself. For example, it is absolutely mandatory to avoid troublesome partial drying of the printing ink on components or assemblies of the printing press. Siccatives are moreover colored and peroxides frequently have poor stability in the ink mixture. The use of organic peroxides, which decompose into radicals only at about 80 degrees Celsius, in offset printing inks is prevented by the fact that familiar offset printing papers do not withstand such temperatures without damage.

In order to overcome such disadvantages, measures are taken to input the energy required for drying as far as possible directly into the printing ink to be dried, i.e. to achieve as high an efficiency as possible.

German Published, Non-Prosecuted Patent Application DE 102 34 076 A1, corresponding to U.S. Pat. No. 6,857,368 B2 describe, respectively, an apparatus and a method for supplying radiant energy to a print medium. The radiation energy source being used emits substantially only light having a wavelength which is non-resonant with absorption wavelengths of water. The absorption of the radiant energy, which is present, for example, in the form of infrared radiation, can be improved by addition of an absorber to the printing ink.

Furthermore, German Published, Non-Prosecuted Patent Application DE 103 16 471 A1, corresponding to U.S. Pat. No. 6,889,608 B2 disclose, respectively, a method for drying printing ink on a print medium and a printing unit suitable for carrying out the method. The print medium is illuminated with light of a laser light source which has a wavelength in the visible spectral range and in resonance with an absorption wavelength of at least one colored pigment that is in any case present in the printing ink. An addition of additional absorbers to the printing ink is thus unnecessary.

Furthermore, German Published, Non-Prosecuted Patent Application DE 103 16 472 A1, corresponding to U.S. Patent Application Publication No. 2004/206260 A1 disclose, respectively, a method for drying a printing ink on a print medium. The print medium is imprinted at a first position with printing ink and is provided at a second position with a treatment composition which produces acceleration of the drying of the printing ink. The treatment composition may be applied in the form of a coating or a primer and the drying of the printing ink may be effected by the action of infrared radiant energy. It is possible to ensure that the treatment composition includes an infrared absorber which is excited by the radiant energy and contributes to the drying of the printing ink.

In this context, it should also be mentioned that German Published, Non-Prosecuted Patent Application DE 101 49 009 A1, corresponding to U.S. Pat. No. 6,829,996 describe, respectively, a method and an apparatus for processing printing ink containing inhibitors, with a catalyst mixture being used in order to accelerate the disintegration of the inhibitors and thus to shorten the drying time. The catalyst mixture can be applied to the print medium through a printing unit cylinder or through a separate application device. A thermally acting drier apparatus is located downstream of the nip or of the application device.

Finally, in German Published, Non-Prosecuted Patent Application DE 10 2006 007 947 A1, accelerated physical drying of the printing ink is achieved in a method for drying printing ink on a print medium by irradiation in such a manner that a drying auxiliary which provides reaction promoters for chemical drying of the printing ink predominantly above a threshold temperature is used, with the threshold temperature of the drying auxiliary being exceeded by the irradiation and the accelerated chemical drying of the printing ink taking place. In German Published, Non-Prosecuted Patent Application DE 10 2006 007 947 A1, a drying auxiliary is understood as meaning a chemical substance which, above a temperature characteristic for the drying auxiliary (threshold temperature) itself, in particular in an excited state, acts as a reaction promoter and supports the chemical drying of printing ink or provides the reaction promoters which support the chemical drying of printing ink. The drying auxiliary may also be referred to as a thermal switch which becomes active upon reaching or exceeding the threshold temperature and provides reaction promoters, whereas the number of reaction promoters provided is negligible below the threshold temperature for the accelerated drying.

There is consequently interest in controlling or in monitoring the drying of printing ink applied to a print medium by variation of an ambient parameter, for example the energy supply. In particular, it is desirable in the context of the controlled or monitored drying in practice, that conventional active substances can be used. For the method or for the use of an apparatus, it should be possible to determine or select when drying is triggered, in particular when the active substance which supports or accelerates the drying is activated. Specifically, it is necessary to find an expedient administration form, a modification, a printing ink composition or a formulation for that purpose to enable an active substance to be provided for the drying as simply as possible and/or as far as possible without disturbing the printing ink mixture.

SUMMARY OF THE INVENTION

It is accordingly an object of the invention to provide a method for drying printing ink and a printing ink, which overcome the hereinafore-mentioned disadvantages of the heretofore-known methods and products of this general type and which make the time of action of an active substance accelerating the drying controllable.

With the foregoing and other objects in view there is provided, in accordance with the invention, a method for drying printing ink. The method comprises providing an inactive active substance in the printing ink in a reaction-inhibited form enclosed in a transport substance before drying, releasing the active substance from the transport substance at the reaction site by an energy supply to activate the active substance for accelerating drying of the printing ink on a print medium, and drying the printing ink applied to the print medium at the reaction site by supplying energy to the printing ink.

According to the invention, targeted activation of the active substance is effected in an advantageous manner by releasing it in a controlled manner from the transport substance holding the active substance. The release results in activation or is the activation. Thus, the starting point of the drying process is advantageously controllable. In particular, the energy supply can cause a threshold energy or corresponding threshold temperature to be exceeded at least for a short period, typically within milliseconds. The active substance may, in particular, be a conventional active substance which, in particular, as such has no threshold energy from which reaction first occurs. The inclusion in a transport substance serves according to the invention as protection from an excessively vigorous or premature reaction. The transport substance serves the function of releasing, in particular releasing to a greater extent, the incorporated active substance only when energy is supplied, in particular from a threshold temperature. The inclusion may be a monomolecular inclusion or a polymolecular inclusion. The transport substance may have a molecular cavity, in particular a closed cavity. The inclusion can (preferably) be three-dimensional or two-dimensional (for example having the topology of small tubes or rings).

The active substance is present in the printing ink in inactive form, in particular before the drying thereof or before the beginning of a drying process. The active substance may be present in a solid, liquid or gaseous state of aggregation. In a first group of developments, the acceleration can be effected by supporting the drying process. In other words, the active substance may be a catalyst. In a second group of developments, the acceleration can be effected on the basis of a reaction of the active substance, with the latter being consumed. The active substance may be a pure substance or a mixture of different substances.

In this application, drying taking place in an accelerated manner is to be understood as meaning drying which takes place more rapidly than drying taking place without external support, for example by targeted radiation, and therefore leads to a satisfactory drying result in a shorter time. Physical drying can be effected, for example, by absorption of water, solvent and/or binder into the print medium or by evaporation of water, solvent and/or binder into the adjacent atmosphere. The physical drying can be accelerated by increasing the temperature. Chemical drying can be effected, for example, by a free radical oxidative polymerization. The chemical drying can be accelerated by increasing the number of suitable reactants, for example supported by an increase in temperature. The reaction taking place during the chemical drying can be divided into the initiation reaction (for example peroxide formation or hydroperoxide formation), the decomposition reactions (for example the peroxide decomposition or hydroperoxide decomposition), with the radicals required for the reaction forming chain growth or chain cleavage and the termination reactions. The course of the initiation reaction and the course of the decomposition reaction can be supported by the use of catalysts or siccatives acting as a catalyst, for example metal soaps of organic acids, such as $Co(OOC-R)_2$ or $Mn(OOC-R)_2$. In this context, also see the book by Römpp entitled: Lexikon der Lacke und Druckfarben [Lexikon of Varnishes and Printing Inks], page 583, published by Thieme Stuttgart, Germany in 1998.

In accordance with another mode of the invention, in various embodiments, the liberation of the active substance from the transport substance can be brought about by supplied heat (for example hot air or microwave radiation), electromagnetic radiation (for example ultraviolet, visible or infrared light), ultrasound or chemical energy (for example the change of the pH of the ambient medium or of the humidity of the environment), a humidity change or a pH change.

In accordance with a further mode of the invention, it is particularly preferred if the active substance remains chemically unchanged upon release. In particular, the active substance enclosed in the transport substance is present in active form but is inactive or deactivated due to the inclusion. In other words, the transport substance forms or serves as a container, a covering, a cage, a vector, a vehicle or the like for avoiding a premature drying process and/or for the efficient supply of the active substance to the reaction site of the drying.

In accordance with an added mode of the invention, the method is carried out in a printing press. The print medium provided with printing ink is also dried according to the invention in one process or production sequence (in-line). The print medium is preferably moved by the printing press. In other words, the reaction site, in particular defined by the position and the site of action of a drying apparatus, is present in such applications at a point along the transport path of the print medium through the printing press. The print medium can be moved past the drying apparatus and the print medium can be moved through the reaction site. Advantageously, already dried printed products leave the printing press. The printing press may, for example, be an offset printing press, a flexographic printing press, a screen printing press or a hybrid printing press. The printing press may, for example, be a sheet-processing printing press or label printing press. The print medium may, in particular, be paper, board, cardboard or organic polymer film.

In accordance with an additional mode of the invention, in the method, electromagnetic laser radiation having a wavelength in the near infrared or in the visible spectral range, in particular having a wavelength of from 2500 nm to 400 nm, for example from 800 nm to 400 nm or from 1600 nm to 800 nm, can be supplied to the reaction site of the printing ink. Specifically, the method according to the invention can be carried out in combination with the individual or combined technical teachings of German Published, Non-Prosecuted Patent Application DE 102 34 076 A1, corresponding to U.S. Pat. No. 6,857,368 B2, German Published, Non-Prosecuted Patent Application 103 16 471 A1, corresponding to U.S. Pat. No. 6,889,608 B2, German Published, Non-Prosecuted Patent Application DE 103 16 472 A1, corresponding to U.S. Patent Application Publication No. 2004/206260 A1 or German Published, Non-Prosecuted Patent Application DE 10 2006 007 947 A1. The total content of the disclosure of those documents is incorporated into this description by explicit reference. The active substance used according to the invention may be an infrared absorber or (preferably) a substance differing from an infrared absorber, with it being possible for an infrared absorber additionally to be added to the printing ink in the case of illumination with infrared light.

In accordance with yet another mode of the invention, in general, the active substance enclosed in inactive form in the transport substance may have already been introduced into the ink mixture during the printing ink production. However, a group of methods according to the invention also includes additional process steps, prior to the drying step, in which the active substance enclosed in the transport substance is mixed with the printing ink and in which the printing ink is applied to the print medium. In particular, this mixing can be effected within a printing press and/or a short time before the use of the printing ink in a printing press. Alternatively, another group of methods according to the invention includes additional process steps, prior to the drying step, in which an active substance-free printing ink is applied to the print medium and the active substance enclosed in the transport substance enters the printing ink either by application of the active substance to the print medium before application of the printing ink or by application to the printing ink present on the print medium. In particular, the active substance enclosed in the transport substance can be applied through the use of a conditioning unit or varnishing unit of a printing press to the print medium or to the printing ink present on the print medium.

In accordance with yet a further mode of the invention, in specific embodiments, the method is preferably used for offset printing, flexographic printing, gravure printing or screen printing. In other words, the printing ink may be an offset printing ink and the application of the offset printing ink to the print medium may be effected in an offset printing process. An offset printing ink may have at least one coloring pigment (colored pigment or carbon black) and a binder formulation, for example 35% to 45% of hard resin, 0 to 20% of alkyd resin, 10 to 45% of vegetable oils or fatty acid esters, 0 to 40% of mineral oils and 0 to 1% of additives (for example wax particles). Alternatively, the printing ink may be a flexographic printing ink and the application of the flexographic printing ink to a print medium may be effected in a flexographic printing process. Alternatively, the printing ink may be a gravure printing ink and the application of the gravure printing ink to a print medium may be effected in a gravure printing process. Alternatively, the printing ink may be a screen printing ink and the application of the screen printing ink to a print medium may be effected in a screen printing process.

With the objects of the invention in view, there is also provided a printing ink, comprising an active substance for accelerating drying of the printing ink on a print medium. The active substance is present in the printing ink before the drying in an inactive and reaction-inhibited form enclosed in a transport substance and the active substance is to be released by an energy supply from the transport substance at a reaction site and activated during the drying.

In accordance with another feature of the invention, in particular, the printing ink may, for example, be an offset printing ink, a flexographic printing ink, a screen printing ink or a gravure printing ink. The active substance may be suitable, in particular, for supporting or accelerating chemical drying, in particular oxidative drying or drying by polymerization.

In accordance with a further preferred feature of the invention, the active substance is enclosed in the transport substance physically without chemical bonding to one another. In other words, the transport substance is a container, a cage, a covering, a capsule or the like, which surrounds, in particular completely surrounds, the active substance without physically or chemically changing it, and with the otherwise active active substance being shielded or concealed from reactants, i.e. being inactive or reaction-inhibited. The energy supply at the reaction site may lead to breaking open or destruction of the transport substance so that the active substance present therein is released.

In accordance with an added feature of the invention, in certain embodiments, the active substance may be a siccative (for example cobalt octanoate or manganese octanoate), a peroxide, an amine, an oxoborate, a peroxoborate (also referred to as perborates, for example sodium peroxoborate), an enzyme (for example lipoxidase, peroxidase), oxygen, ozone or nitric oxide. Alternatively or in addition, the active substance may be a radical or a polymerization initiator. Regarding peroxides, also see the book by Römpp, entitled: Lexikon der Lacke und Druckfarben [Lexikon of Varnishes and Printing Inks], pages 438-439, published by Thieme Stuttgart, Germany 1998. The following may be explicitly mentioned as examples of peroxides which gradually decompose upon increasing the temperature above a threshold temperature and eliminate oxygen or form radicals: dibenzoyl peroxide (threshold temperature at about 70° C.), methyl ethyl ketone peroxide (threshold temperature at about 80° C.), cyclohexanone peroxide (threshold temperature at about 90° C.) and cumene hydroperoxide (threshold temperature at about 100° C.), and isobutyl peroxide, dibenzoyl peroxide and tertiary butyl peroxy-2-ethylhexanoate. The following may be mentioned as examples of amines: mono-, di- or trialkylamines (ethylamine, diethylamine, triethylamine), polyamines (ethylenediamine, phenylenediamine, tetraaminoethylene) or α-amino ketones. Furthermore, monoethanolamines, dimethylethanolamines, diethanolamines or triethanolamines, which begin to decompose at temperatures above about 200° C. to 250° C. to give reaction promoters. N-Acyloxyamines and N-alkoxyamines may be cited as further embodiments.

In accordance with an additional feature of the invention, in certain embodiments, the transport substance may be in the form of a capsule, a cage or a ball, for example. Alternatively or in addition, the transport substance may be a microball, a hollow microball, a microcapsule, a microsphere, a nanoball, a hollow nanoball, a nanocapsule or a nanosphere.

In accordance with yet another, particularly preferred feature of the invention, the transport substance is a wax. The release of the active substance from the transport substance in the form of a wax can be achieved by melting the wax which takes place in a targeted manner at the reaction site. Specifically, the wax being used may be a paraffin, a fatty acid, a polyethylene, polytetrafluoroethylene, a polypropylene, a polystyrene, a Fischer-Tropsch wax (for example a hard paraffin, an oxidation product, a partly hydrolyzed wax), an epoxide, an acrylate, a gelatin or agar-agar. If siccatives, peroxides or some other conventional active substances are to be enclosed in a wax, they must optionally be suitably derivatized so that they can be dissolved or finely dispersed (emulsified) in the relevant wax.

In accordance with yet a further feature of the invention, alternatively, the transport substance may be a polyelectrolyte, a membrane (for example N,N-diethylacrylamide) or a microgel particle. The transport substance in the form of a polyelectrolyte may be a capsule composed of a plurality of layers. A microgel particle may be filled like a sponge with the active substance and it may, in particular, be formed of different thermally sensitive polymer shells, for example a core of poly-N-isopropylmethacrylamide and a shell of poly-N-isopropylacrylamide (also see Chem. Unsere Zeit [Chemistry in our Time] 2006, 40, 222-225). The use of a transport substance in the form of a membrane is particularly preferred as a container for peroxoborates or siccatives.

In accordance with yet an added feature of the invention, once again as an alternative to embodiments of transport substances already discussed, the transport substance may be a cyclodextrin, an aza-crown ether, a calixarene, a cyclotriveratrylene, a chitin or a chitosan.

Cyclodextrins are already used as transport substances in order to bring oily substances in molecular form into aqueous media by incorporation into the transport substances which are usually externally hydrophilic. Derivatives may also be externally hydrophobic. Aza-crown ethers, as well as derivatives of these classes of substances, are on the other hand generally suitable for bringing aqueous substances in molecular form into oily media by incorporation into the transport substances which are usually externally hydrophobic. Derivatives may also be externally hydrophilic. In the case of cyclodextrins, it is often from a slow release of the ingredients (for example fragrances or active substances). In contact with moisture, for example upon application of humectants in the printing process or upon emulsion formation at the inking cylinders, water displaces the active substance incorporated according to the invention for acceleration of drying, in particular a siccative or perborate, from the cyclodextrin or the aza-crown ether, so that they are released in the medium. Alternatively, the release is effected by a supply of heat. The cyclodextrin molecules provided with an active substance can be emulsified in a highly concentrated aqueous form in the oily printing inks during the ink production. An analogous procedure is envisaged according to the invention for chitins or chitosans: in a preferred embodiment, a microsphere formed of this material, preferably having a degree of deacetylation of less than 50%, preferably less than 25%, which may hold an active substance, is incorporated directly into a printing ink composition.

In accordance with a concomitant feature of the invention, the printing ink according to the invention may include an additive, which absorbs radiation in the near infrared spectral range, and/or metal nanoparticles for absorption of laser radiation (for example including silver or gold). In this way, the printing ink can be adapted for a drying method according to the technical teachings of German Published, Non-Prosecuted Patent Application DE 102 34 076 A1, corresponding to U.S. Pat. No. 6,857,368 B2 and German Published, Non-Prosecuted Patent Application DE 103 16 472 A1, corresponding to U.S. Patent Application Publication No. 2004/206260 A1. The additive can be different from the active substance used according to the invention. This supporting additive may improve the temperature trend during the irradiation.

Other features which are considered as characteristic for the invention are set forth in the appended claims.

Although the invention is illustrated and described herein as embodied in a method for drying printing ink and a printing ink, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
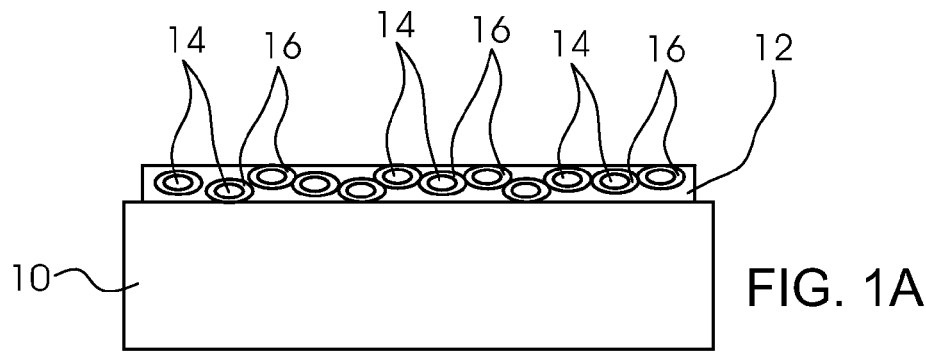
FIGS. 1A-1D are diagrammatic, cross-sectional views of a print medium showing a sequence of an embodiment of the method for drying according to the invention.

Before embodiments of the method according to the invention are described specifically with reference to the figures, a detailed example of an advantageous and also preferred embodiment of a printing ink according to the invention in the form of an offset printing ink in combination with laser drying, will first be given.

An organic peroxide, specifically sodium peroxoborate or tert-butyl peroxy-2-ethylhexanoate, as the active substance, is mixed in a proportion by weight of 10% with PE wax and incorporated in an amount of 1.5% by weight in the form of small balls of about 1 μm in size during the printing ink production. The active substance is subsequently surrounded by PE wax as a transport substance and is thus inactive. The small balls behave in the printing ink mixture in the same way as commercially available PE wax additives which are used, for example, as antiabrasion additives.

The printing inks can usually be printed onto a print medium and also behave in the known manner in an inking unit of a printing press. It is only after the printing, but before the delivery, that the print medium, in particular a sheet, is irradiated at a reaction site across the page with laser light in the near infrared spectral range (NIR). In this context, reference may once again be made to the technical teachings of the laser drying of printing ink, as has been published in German Published, Non-Prosecuted Patent Application DE 102 34 076 A1, corresponding to U.S. Pat. No. 6,857,368 B2, German Published, Non-Prosecuted Patent Application DE 103 16 471 A1, corresponding to U.S. Pat. No. 6,889,608 B2, German Published, Non-Prosecuted Patent Application DE 103 16 472 A1, corresponding to U.S. Patent Application Publication No. 2004/206260 A1 or German Published, Non-Prosecuted Patent Application DE 10 2006 007 947 A1, which are explicitly incorporated by reference in this description. An NIR absorber which is optionally additionally present in the ink mixture or in the small wax balls themselves (alternatively metal nanoparticles) ensures, at least for a short time interval, temperatures above the melting point of PE wax, i.e. above about 110° C. As a result of the melting of the wax, the active substance, for example the sodium peroxoborate, is released and can thus accelerate the polymerization from an expedient time, in particular only at the reaction site.

While on one hand the near infrared laser light is more easily absorbed by larger wax balls into which an NIR absorber is incorporated, on the other hand due to a longer absorption distance, it may also be advantageous to use smaller balls in order to achieve a more uniform distribution.

The embodiment can easily be implemented because only small changes in the formulation and rheology of the offset inks are made. The combination with the laser drying is particularly expedient. Peroxoborates react faster on supply of moisture, which is present, at the nip, for example due to the humectant, and as a result of heat, in this case in the form of laser irradiation.

It should be mentioned at this point that the wax particles, as well as nanocapsules or microcapsules, membranes and the other transport substances discussed, should not exceed a size of 10 μm (maximally 30 μm) in order to avoid disturbing the printing process. Ideally, the particles are smaller than 1 μm, in particular substantially smaller. They are added in a proportion by weight of not more than 10%, preferably not more than 5% or not more than 1%, optionally also less than 0.1%, to the ink formulation.

Figure 1B:
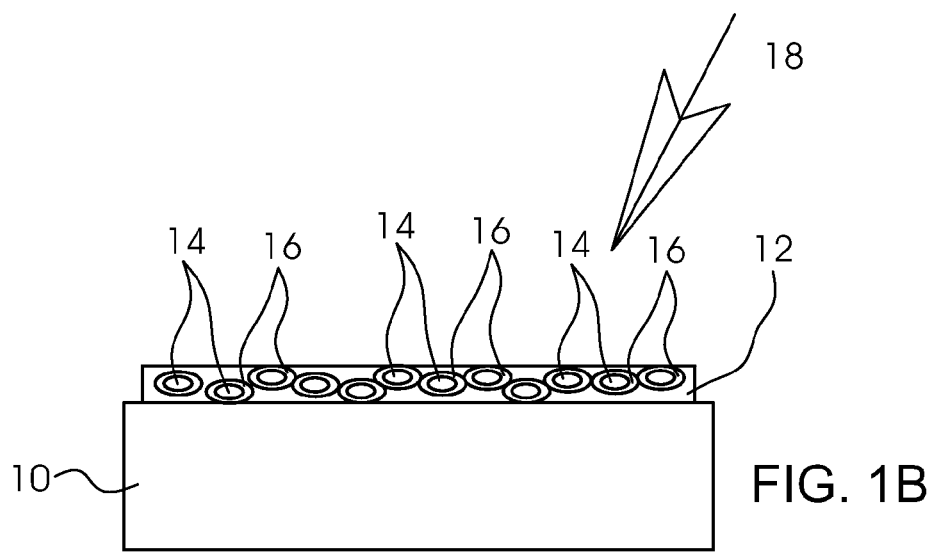
Figure 1C:
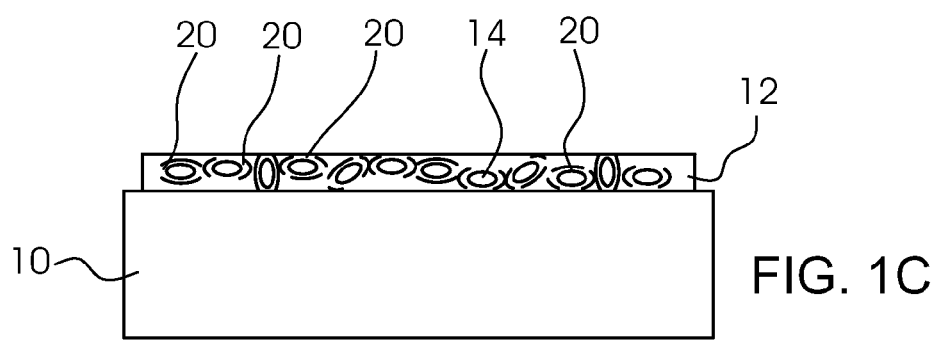
Figure 1D:
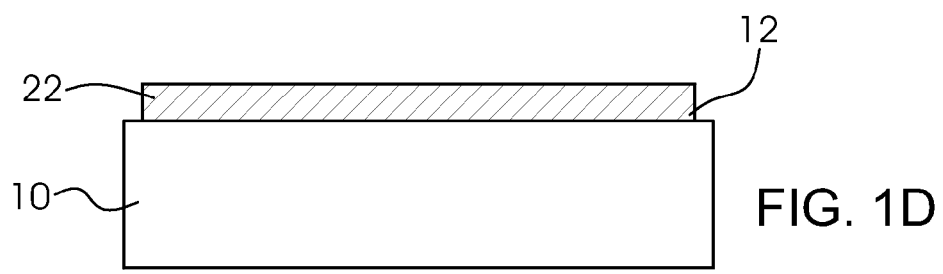

Referring now to the figures of the drawings in detail and first, particularly to FIGS. 1A to 1D thereof, there is seen diagrammatically, in four cross-sectional illustrations, the sequence of an embodiment of the method for drying according to the invention. In FIG. 1A, a print medium 10 having a layer of undried printing ink 12 is shown. According to the invention, the printing ink 12 has an active substance 14 which is enclosed in a transport substance 16 and intended for accelerating or supporting the drying in the form of microballs. As a result of the inclusion, the active substance 14 is inactive. In FIG. 1B, it is indicated that the undried printing ink 12 present on the print medium 10 is supplied with energy at a reaction site (energy supply 18), preferably through the use of a laser beam, as already explained elsewhere in this description of the invention. The energy acts at least on the transport substance 16. FIG. 1C relates to the release of the active substance 14 from the transport substance 16: due to the energy supply 18, the covering of the active substance 14, which is formed by the transport substance 16, is destroyed, broken open or removed so that the active substance 14 is provided in active form for the drying process. After the energy absorption, an opened transport substance 20, for example as fragments or as a chemical change in a reaction depending on the embodiment of the transport substance 16, and the released active substance 14, are present in the printing ink 12 on the print medium 10. Finally, FIG. 1D shows the result of the method according to the invention: a layer of dried printing ink 22 is now present on the print medium 10.

Figure 2:
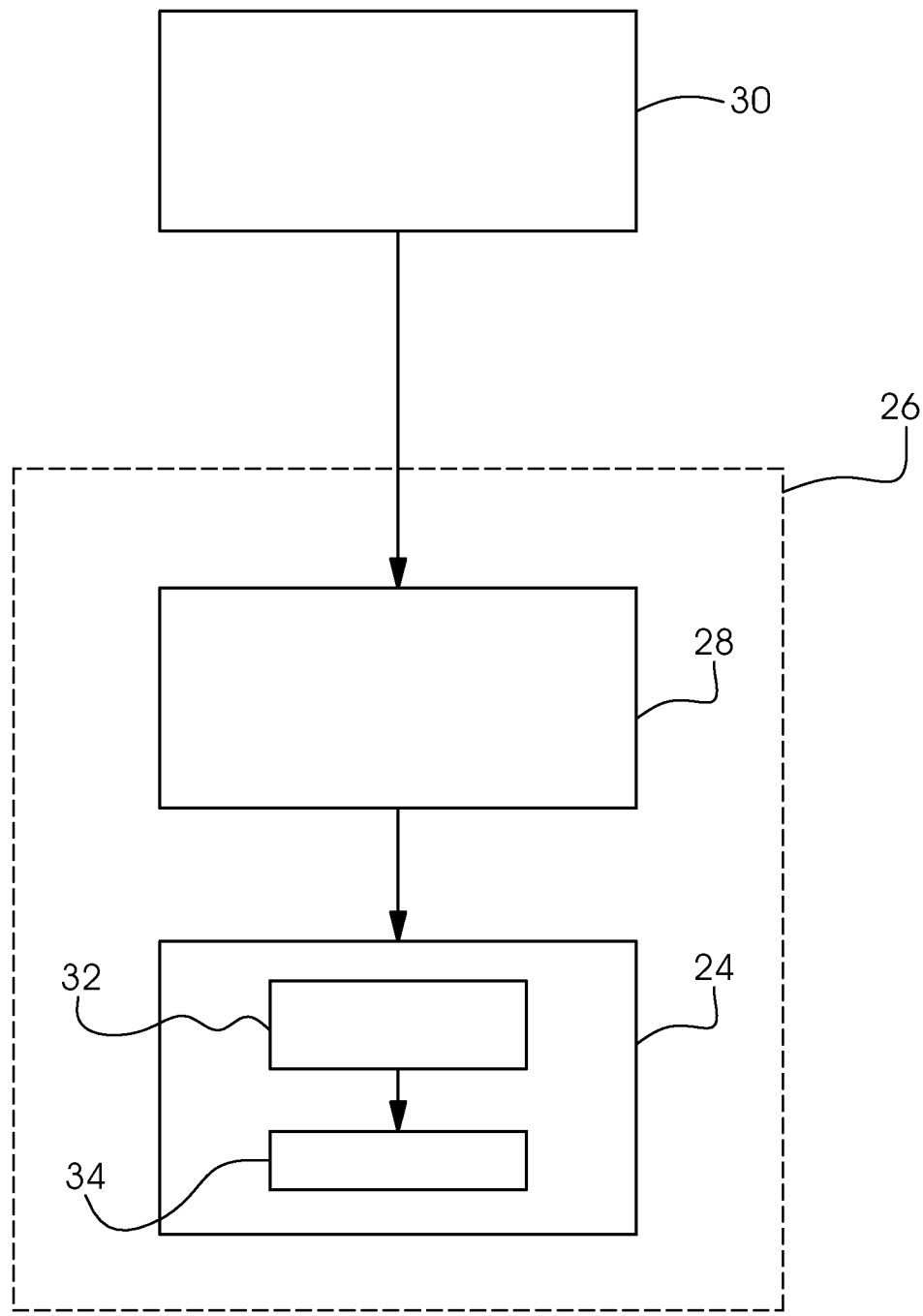
FIG. 2 is a flow diagram of an advantageous embodiment of the method for drying according to the invention as part of a printing process.

FIG. 2 is a flow diagram of an advantageous embodiment of the drying method according to the invention as part of a printing process. In a preferred embodiment, a drying method 24 is one of steps 26 which, like an actual printing 28, take place or are carried out in the printing press. Upstream of or before these steps is an admixing 30 of the active substance which is required according to the invention and which is held in a transport substance and is thus inactive. For example, this step takes place during the printing ink preparation itself. The drying method 24 according to the invention includes at least steps including firstly a release 32 of the active substance from the transport substance through the use of a corresponding energy supply and then an accelerated drying 34 of the printing ink on the print medium.

The invention claimed is:

1. A method for drying printing ink, the method comprising the following steps:
providing in the printing ink a transport substance and a process substance in an inactive and reaction-inhibited form enclosed in the transport substance before drying;
releasing the process substance from the transport substance at a reaction site by an energy supply to activate the process substance for accelerating drying of the printing ink on a print medium; and
drying the printing ink applied to the print medium at the reaction site by supplying energy to the printing ink.

2. The method for drying printing ink according to claim 1, which further comprises carrying out the step of releasing the process substance from the transport substance by supplying heat, electromagnetic radiation, ultrasound, chemical energy, change in moisture or change in pH.

3. The method for drying printing ink according to claim 1, wherein the process substance remains chemically unchanged upon release.

4. The method for drying printing ink according to claim 1, which further comprises carrying out the method in a printing press.

5. The method for drying printing ink according to claim 1, which further comprises supplying electromagnetic laser radiation having a wavelength of from 2500 nm to 400 nm to the printing ink at the reaction site.

6. The method for drying printing ink according to claim 1, which further comprises mixing the process substance enclosed in the transport substance with the printing ink and applying the printing ink to the print medium, prior to the drying step.

7. The method for drying printing ink according to claim 1, which further comprises applying a printing ink free of process substance to the print medium and entering the process substance enclosed in the transport substance into the printing ink by application of the process substance to the print medium before application of the printing ink, prior to the drying step.

8. The method for drying printing ink according to claim 6, which further comprises selecting the printing ink and an application of the printing ink from the group consisting of:
an offset printing ink and an application of the offset printing ink to the print medium in an offset printing process;
a flexographic printing ink and an application of the flexographic printing ink to the print medium in a flexographic printing process;
a gravure printing ink and an application of the gravure printing ink to the print medium in a gravure printing process; and
a screen printing ink and an application of the screen printing ink to the print medium in a screen printing process.

9. The method for drying printing ink according to claim 7, which further comprises selecting the printing ink and an application of the printing ink from the group consisting of:
an offset printing ink and an application of the offset printing ink to the print medium in an offset printing process;
a flexographic printing ink and an application of the flexographic printing ink to the print medium in a flexographic printing process;
a gravure printing ink and an application of the gravure printing ink to the print medium in a gravure printing process; and
a screen printing ink and an application of the screen printing ink to the print medium in a screen printing process.

10. A printing ink, comprising:
a transport substance;
a process substance for accelerating drying of the printing ink on a print medium;
said process substance being present in the printing ink before the drying in an inactive and reaction-inhibited form enclosed in said transport substance; and
said process substance configured to be released by an energy supply from the transport substance at a reaction site and activated during the drying.

11. The printing ink according to claim 10, wherein the printing ink is selected from the group consisting of an offset printing ink, a flexographic printing ink, a screen printing ink and a gravure printing ink.

12. The printing ink according to claim 10, wherein said process substance is configured for supporting or accelerating chemical drying.

13. The printing ink according to claim 10, wherein said process substance is enclosed in said transport substance physically without chemical bonding to one another.

14. The printing ink according to claim 10, wherein said process substance is selected from the group consisting of a siccative, a peroxide, an amine, an oxoborate, a peroxoborate, an enzyme, oxygen, ozone and nitric oxide.

15. The printing ink according to claim 10, wherein said process substance is a radical or a polymerization initiator.

16. The printing ink according to claim 10, wherein said transport substance is selected from the group consisting of a capsule, a cage and a ball.

17. The printing ink according to claim 10, wherein said transport substance is selected from the group consisting of a microball, a hollow microball, a microcapsule, a microsphere, a nanoball, a hollow nanoball, a nanocapsule and a nanosphere.

18. The printing ink according to claim 10, wherein said transport substance is a wax.

19. The printing ink according to claim 10, wherein said transport substance is selected from the group consisting of a polyelectrolyte, a membrane and a microgel particle.

20. The printing ink according to claim 10, wherein said transport substance is selected from the group consisting of a cyclodextrin, an aza-crown ether, a calixarene, a cyclotriveratrylene, a chitin and a chitosan.

21. The printing ink according to claim 10, which further comprises an additive absorbing radiation in the near infrared spectral range.

22. The method for drying printing ink according to claim 1, which further comprises applying a printing ink free of process substance to the print medium and entering the process substance enclosed in the transport substance into the printing ink by application to the printing ink present on the print medium, prior to the drying step.

23. The printing ink according to claim 10, which further comprises metal nanoparticles for absorption of laser radiation.

* * * * *